United States Patent [19]
Kuratsuji et al.

[11] 3,961,008
[45] June 1, 1976

[54] PROCESS FOR PREPARING POLYESTER SHAPED ARTICLES

[75] Inventors: Takatoshi Kuratsuji; Shoji Kawase; Takeo Shima, all of Iwakuni; Sakae Shimotsuma, Atsugi; Masahiro Hosoi, Sagamihara, all of Japan

[73] Assignee: Teijin Limited, Osaka, Japan

[22] Filed: Aug. 26, 1974

[21] Appl. No.: 500,503

[30] Foreign Application Priority Data
Aug. 29, 1973 Japan............................ 48-96229

[52] U.S. Cl. ............................. 264/178 R; 260/75 T; 264/95; 264/216; 264/237; 264/290 R
[51] Int. Cl.².................... B29C 25/00; B29D 23/04
[58] Field of Search ........ 264/176 R, 290 T, 75 R, 264/75 T, 216, 95, 290 R, 291, 237, 178 R

[56] References Cited
UNITED STATES PATENTS

| | | |
|---|---|---|
| 2,936,492 | 5/1960 | Swerlick et al. .................... 264/216 |
| 3,243,486 | 3/1966 | Pilaro.................................... 264/95 |
| 3,377,319 | 4/1968 | Wiener............................. 260/75 R |
| 3,683,060 | 8/1972 | Tanabe et al. .................... 260/75 T |
| 3,754,067 | 8/1973 | St.Eve et al........................... 264/95 |

FOREIGN PATENTS OR APPLICATIONS

| | | | |
|---|---|---|---|
| 987,013 | 3/1965 | United Kingdom............... 260/75 R |
| 604,073 | 6/1948 | United Kingdom............... 260/75 R |

*Primary Examiner*—Jeffery R. Thurlow
*Attorney, Agent, or Firm*—Sherman & Shalloway

[57] ABSTRACT

A process for preparing a shaped article by melt-extruding a polyester containing tetramethylene naphthalene-2,6-dicarboxylate or hexamethylene naphthalene-2,6-dicarboxylate as a main recurring unit, wherein the extrudate is exposed to a temperature of 75° to 450°C. for 1 to 180 seconds immediately after extrusion.

4 Claims, 1 Drawing Figure

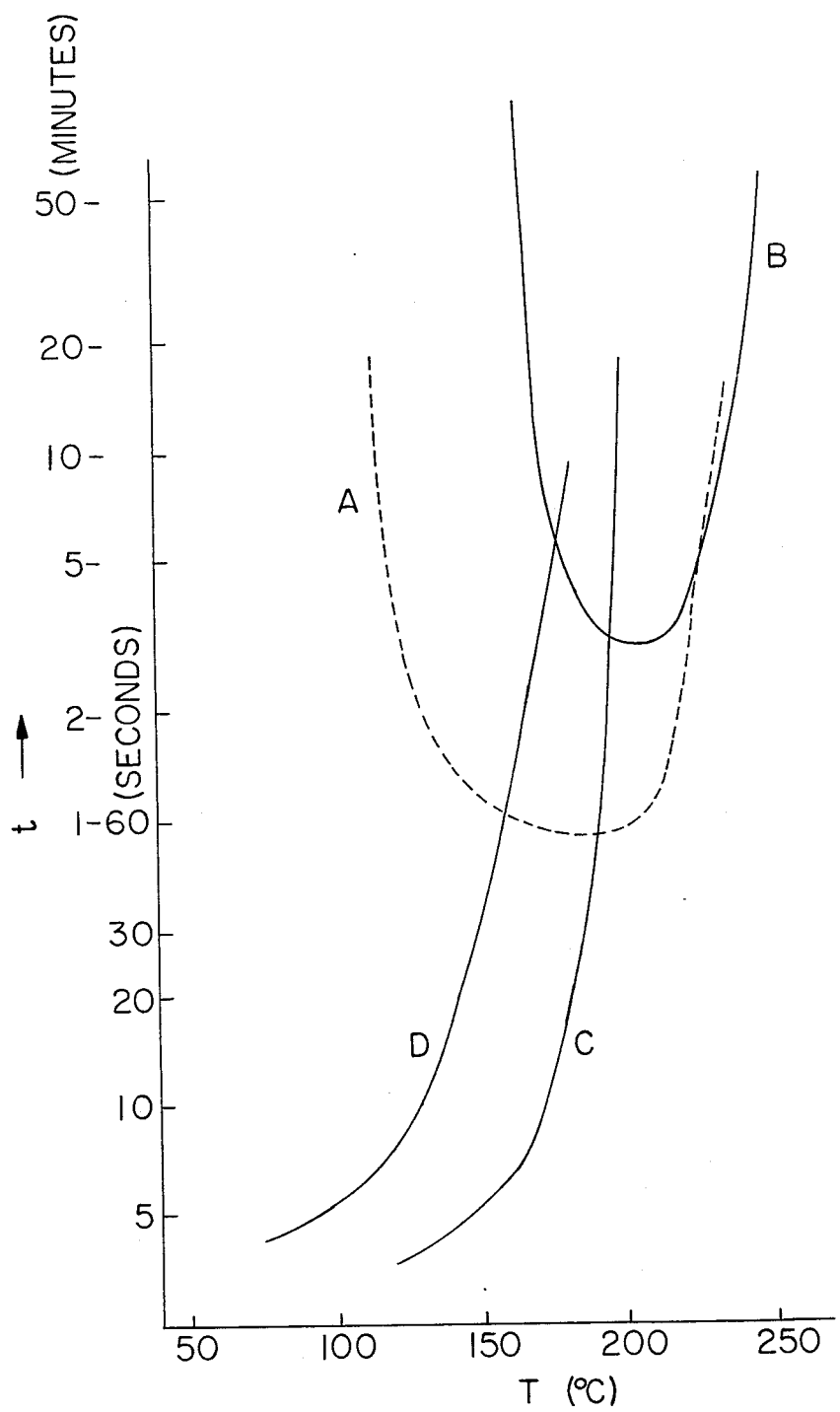

PROCESS FOR PREPARING POLYESTER SHAPED ARTICLES

This invention relates to a process for preparing shaped articles of polyesters. More specifically, the invention relates to a process for preparing shaped articles of polyesters by melt-extruding a polyester containing tetramethylene naphthalene-2,6-dicarboxylate or hexamethylene naphthalene-2,6-dicarboxylate as a main recurring unit, in which the extrudate is treated under specific conditions immediately after extrusion thereby to obtain shaped articles having good transparency and low density.

Shaped articles of polyesters composed of ethylene terephthalate as a main recurring unit, in the form of films, sheets and tubes, have been widely utilized for magnetic recording materials, electrically insulating materials, etc. because of their superior mechanical and electrical properties. Furthermore, it was found that films, sheets and tubes of polyesters containing ethylene napthalene-2,6-dicarboxylate as a main recurring unit have superior thermal properties as well as superior mechanical and electrical properties, and since then, their usages have been exploited. It has recently been discovered that polyesters composed of a polymethylene naphthalene-2,6-dicarboxylate as a main recurring unit, especially those composed of tetramethylene naphthalene-2,6-dicarboxylate or hexamethylene naphthalene-2,6-dicarboxylate as a main recurring unit, are comparable to the above two types of polymers in regard to mechanical properties (strength, Young's modulus), electrical properties (dielectric breakdown voltage) and thermal properties (thermal stability) and have superior chemical properties (chemical resistance). However, since the polyesters containing tetramethylene naphthalene-2,6-dicarboxylate or hexamethylene-2,6-dicarboxylate as a main recurring unit have very fast speeds of crystallization, transparent shaped articles are difficult to obtain from them by ordinary methods. In the case of polyethylene terephthalate, for example, a transparent, low-density unstretched film or sheet can be easily obtained by contacting a melt-extrudate of the polymer with a casting drum maintained at a temperature of 50° to 70°C. But in the case of poly(tetra- or hexa-methylene naphthalene-2,6-dicarboxylate), the use of such a method results in the crystallization of the polymer, and only a nontransparent, high density unstretched film or sheet is obtained.

Accordingly, an object of this invention is to provide a process which can produce shaped articles of good transparency and low density from polyesters containing tetra (or hexa) methylene naphthalene-2,6-dicarboxylate as a main recurring unit.

Another object of this invention is to provide shaped articles such as films, sheets or tubes of poly (tetra- or hexa-methylene naphthalene-2,6-dicarboxylate) which have superior mechanical, electrical, thermal and chemical properties by the above-mentioned process.

Other objects of this invention will become apparent from the following description.

In the course of investigations with a view to achieving these objects, the inventors of the present application discovered an interesting phenomenon regarding the behaviors of various polyesters during crystallization. This will be stated below with reference to the accompanying drawing which is a graphic representation showing half-crystallization periods in the isothermal crystallization of various polyesters. In the graph, the axis of abscissa shows the crystallization temperature (T°C.) and the ordinate shows the half-crystallization period (t in minutes or seconds). Curve A in the graph refers to poly(ethylene terephthalate); Curve B, to poly(ethylene naphthalene-2,6-dicarboxylate); Curve C, to poly(tetramethylene naphthalene-2,6-dicarboxylate); and Curve D, to poly(hexamethylene naphthalene-2,6-dicarboxylate).

The graph shows the relation between temperatures and half-crystallization periods when the polyesters are each crystallized at the predetermined temperatures from the molten state (without quenching the molten polymers). It can be seen from the graph that in the case of the poly(ethylene terephthalate) (Curve A) and the poly (ethylene naphthalene-2,6-dicarboxylate) (Curve B), the maximum speed of crystallization is attained at about 200°C. As the temperature decreases from this point, the speed of crystallization becomes lower. Furthermore, the above maximum speed of crystallization is not so high, and is about 1 minute (Curve A) and about 3 minutes (Curve B). Accordingly, in the case of these two polyesters, shaped articles of good transparency can be obtained only by quenching the malt extrudate. On the other hand, in the case of the poly(tetramethylene naphthalene-2,6-dicarboxylate) (Curve C) and the poly(hexamethylene naphthalene-2,6-dicarboxylate) (Curve D), the speed of crystallization becomes higher as the temperature becomes lower, as can be seen from the graph. Hence, mere quenching of the melt-extrudate does not give shaped articles of good transparency. This graph suggests that if the melt-extrudate is first solidified while being maintained at a high temperature, and then quenched, shaped articles having a low degree of crystallization, that is, transparent shaped articles, can be obtained.

Further investigations based on the suggestion obtained by such a basic experiment finally led to the discovery that the above-mentioned objects of this invention can be achieved by solidifying the melt-extrudate while maintaining it for 1 to 180 seconds at a temperature of 75° to 450°C.

Thus, according to this invention, there is provided a process for preparing shaped articles by melt-extruding a polyester containing tetramethylene naphthalene-2,6-dicarboxylate or hexamethylene napthalene-2,6-dicarboxylate as a main recurring unit, wherein the extrudate is exposed to a temperature of 75° to 450°C. for 1 to 180 seconds, preferably for 5 to 180 seconds, immediately after extrusion.

The shaped articles, as referred to in this application, include films, sheets and tubes. The tubes mean those which have a small thickness, a small diameter, and flexibility, and are usually used as a double tape.

Various embodiments can be employed according to the type of the desired shaped article when performing the process of this invention.

For example, when it is desired to produce films or sheets, the most suitable method is to extrude a molten polyester from a T-die, and immediately after extrusion, intimately adhere the extrudate to the surface of a casting drum kept at a temperature ranging from 75°C. to a point lower than the melting point of the polyester, preferably 90° to 180°C. for 5 to 180 seconds, preferably for 10 to 120 seconds, thereby solidifying it. An air knife can of course be used in order to ensure the intimate adhesion of the extrudate to the casting drum.

When it is desired to produce a tube, the most suitable method is to extrude the molten polyester through a ring die, and immediately after extrusion, pass the extrudate through a gaseous atmosphere kept at a temperature of 150° to 450°C., preferably 200° to 400°C. over the course of 1 to 30 seconds, preferably 5 to 20 seconds. Preferably, the gaseous atmosphere is provided in an area extending from the extrusion port to a point 100 cm beneath it. Usually, a stream of heated air is used as the gas.

There can also be used a method applicable to the production of any of films, sheets and tubes, which comprises passing an extrudate of molten polyester, immediately after extrusion, through a liquid kept at a temperature ranging from 75°C. to a point lower than the melting point of the polyester, preferably 85° to 160°C., for 5 to 180 seconds, preferably 10 to 120 seconds thereby to solidify the extrudate. Examples of suitable liquids are water, ethylene glycol, glycerol, cotton seed oil, linseed oil, soybean oil, and silicone oil.

In any of the above methods, the solidified film, sheet or tube is then quenched. Quenching can be performed by known means such as blowing of air by an air knife, immersion in a water bath or contact with a chilled roll.

The polyesters containing tetramethylene naphtalene-2,6-dicarboxylate or hexamethylene naphthalene-2,6-dicarboxylate as a main recurring unit denote polyesters prepared from naphthalene-2,6-dicarboxylic acid as a main acid component and tetramethylene glycol or hexamethylene glycol as a main glycol component. The term "as a main recurring unit" means that the recurring unit is contained in a proportion of at least about 85 mol%, preferably at least about 90 mol%, in the polyester molecule. These polyesters can be prepared by polymerizing naphthalene-2,6-dicarboxylic acid and/or its functional derivatives and tetra (or hexa) methylene glycol and/or its functional derivatives in the presence of a suitable catalyst, and if desired, adding up to about 15 mol%, preferably up to about 10 mol%, of a third component before the completion of the polymerization.

Examples of suitable third components are dicarboxylic acids such as terephthalic acid, isophthalic acid, 1,5-naphthalenedicarboxylic acid, 2-methyl terephthalic acid, 4-methyl isophthalic acid, 2-chloroterephthalic acid, 2-bromoterephthalic acid, 2,5-dibromoterephthalic acid, 5-sodium sulfoisophthalic acid, diphenyldicarboxylic acid, diphenyl ether dicarboxylic acid, diphenyl sulfonedicarboxylic acid, diphenoxyethane dicarboxylic acid, adipic acid or sebacic acid; hydroxy-carboxylic acids such as p-$\beta$-hydroxyethoxybenzoic acid; dihydroxy compounds such as ethylene glycol, diethylene glycol, neopentylene glycol, hexamethylene glycol (when tetramethylene glycol is used as a polyol component), tetramethylene glycol (when hexamethylene glycol is used as a polyol component), decamethylene glycol, 1,4-cyclohexane dimethylol (cis and/or trans), hydroquinone, bis ($\beta$-hydroxyethoxy) benzene, bisphenol A, bis($\beta$-hydroxyethoxy) bisphenol A, bis($\beta$-hydroxyethoxy)tetrabromo bisphenol A, di-P-hydroxyphenyl sulfone, di-p-($\beta$-hydroxyethoxy) phenylsulfone, polyoxyethylene glycol, polyoxypropylene glycol or polyoxytetramethylene glycol; and the derivatives of these compounds. Compounds having at least three ester-forming functional groups, such as glycerine, pentaerythritol, trimethylol propane, trimellitic acid, trimesic acid, pyromellitic acid or the functional derivatives of these, can also be used as a third component to such an extent that a substantially linear polyester can be obtained.

In order to regulate the degree of polymerization or the viscosity of the polymer, a monofunctional compound such as benzoic acid or naphthoic acid can also be added to the polymerization system. Needless to say, it is possible to incorporate in the polyester such additives as a delusterant such as titanium dioxide, a stabilizer such as phosphoric acid, phosphorous acid, phosphonic acid or esters of these, an ultraviolet absorber such as benzophenone derivatives or benzotriazole derivatives, an anti-oxidant, a slipping agent, a coloring agent, a fire retardant, or a filler by a customary method.

Polyester shaped articles such as unstretched films, sheets or tubes obtained by performing the above treatment and then cooling in accordance with this invention have good transparency, low density, and superior mechanical properties such as strength, electrical properties such as dielectric breakdown voltage, and thermal properties such as thermal stability. When these articles are stretched in a customary manner, not only the mechanical strength characteristics such as strength or Young's modulus, but also, surprisingly, the chemical properties, such as alkali resistance, are also markedly improved. Accordingly, the polyester shaped articles of this invention can be more advantageously used in the fields in which the conventional polyester shaped articles have found utility.

The following Examples illustrate the present invention specifically. The various properties given in these Examples were measured by the following methods.

1. Intrinisic Viscosity 120 mg of the polymer is dissolved in 10 ml. of o-chlorophenol, and its viscosity is measured at 35°C. The intrinsic viscosity is calculated from the viscosity so measured.

2. Melting point

The polymer is heated at a rate of 32°C./min. using a differential scanning calorimeter (DSC), and the temperature at the top of the endothermic peak that occurs as a result of melting is defined as the melting point of the polymer.

3. Density

Measured in accordance with ASTM D-1505-68 at 25°C. using a density gradient tube containing carbon tetrachloride-n-heptane.

4. Strength and elongation at break and Young's modulus

A test piece having a length of 15 cm and a width of 1 cm is cut out so that the longitudinal direction of the film. Using this sample, measurement is made on an Instron-type tensile tester at a tensile speed of 10 cm/min. with a chuck distance of 10 cm.

5. Dielectric Breakdown Voltage

Measured in accordance with JIS C-2318 using a disc electrode with a diameter of 25 mm while applying an alternate current and elevating the voltage at a rate of 1 KV/sec.

6. Thermal stability

A sample of the same shape as mentioned in (4) above is deteriorated in a gear oven at 200°C. for 100 hours, and then it elongation is measured. The results are evaluated on a scale of "good" which represents an elongation of at least 30%, "fair" which represents an elongation of 10 to 30%, and "poor" which represents an elongation of less than 10%.

7. Chemical resistance

A sample of the same shape as described in paragraph (4) above is immersed in a 10% aqueous solution of sodium hydroxide for 24 hours at 60°C., and then its strength is measured. The strength retention is determined as compared with the strength before immersion. The results are evaluated on a scale of "good" which represents a strength retention of at least 40%, and "poor" which represents a strength retention of less than 40%.

REFERENTIAL EXAMPLE A

Preparation of poly(tetramethylene naphthalene-2,6-dicarboxylate)

A reactor equipped with a condenser and a stirrer was charged with 216 parts of naphthalene-2,6-dicarboxylic acid, 180 parts of tetramethylene glycol and 0.102 part of tetrabutyl titanate, and the reaction was performed at 220°C. at atmospheric pressure, while distilling off water or tetrahydrofuran formed as a result of the reaction. After 150 minutes, the carboxyl group concentration of the reaction mixture reached 360 equivalents/$10^6$g (about 95% as a degree of esterification), at which time the reaction was stopped and the contents were transferred to a post-polymerization reactor. The reaction was then carried out at 250°C. at atmospheric pressure for 5 minutes. Then, the pressure of the reaction system was gradually reduced. First, the pressure was reduced to 3 mmHg over the course of 30 minutes and the temperature was raised to 260°C. In the course of another 30 minutes, the pressure was reduced to 0.5 mmHg, and the reaction was carried out at a temperature of 260°C. and a pressure of 0.5 mmHg for 200 minutes. Then, the pressure was returned to the normal atmospheric pressure using nitrogen to afford poly(tetramethylene naphthalene-2,6-dicarboxylate) having a melting point of 238°C. and an intrinisic viscosity of 0.95. The polymer was pulverized into chips.

REFERENTIAL EXAMPLE B

Preparation of poly(hexamethylene napthalene-2,6-dicarboxylate)

A reactor equipped with a rectifying column was charged with 244 parts of dimethyl naphthalene-2,6-dicarboxylate, 177 parts of hexamethylene glycol and 0.068 parts of tetrabutyl titanate, and the ester-interchange reaction was performed at 180° to 240°C. When about 85%, based on theory, of methanol (54 parts) was distilled out, the contents were transferred to a reactor equipped with a stirrer, a condenser and a nitrogen inlet tube. The reaction was performed at 250°C. while reducing the pressure from atmospheric pressure to 3 mmHg over the course of about 30 minutes, and further reducing the pressure to 0.5 mmHg over the course of another 30 minutes. After this high vacuum reaction was continued for 180 minutes, the pressure of the reaction system was returned to normal atmospheric pressure using nitrogen to afford poly(hexamethylene naphthalene-2,6-dicarboxylated) having a melting point of 208°C. and an intrinsic viscosity of 0.88. This polymer was pulverized into chips.

EXAMPLES 1 TO 9 AND COMPARATIVE EXAMPLES 1 TO 4

The chips of poly(tetramethylene naphthalene-2,6-dicarboxylate) prepared in Referential Example A were melted at 280°C. and extruded through a T-die onto a casting drum kept at each of the temperatures shown in Table 1. The extruded film was contacted with the casting drum for the time indicated in Table 1, and immediately then, air was blown against it using an air knife to form an unstretched film having a thickness of about 300 microns. The properties of the unstretched films obtained are shown in Table 1.

The unstretched film was stretched at 85°C. simultaneously in two directions. The maximum stretch ratio at which the film could be uniformly stretched without breakage was determined. Furthermore, the stretched film was heat-treated at 180°C. at constant length, and the properties of the treated film were measured. The results are shown in Table 1.

It can be seen from Table 1 that the unstretched films obtained by the process of this invention have an elongation of as high as more than 300%, but their strength and dielectric breakdown voltage are on fairly satisfactory levels and moreover, they have superior thermal stability showing good retention of high elongation even after being exposed to a hot atmosphere for long periods of time. The unstretched films are transparent, have low density, and can be stretched at a ratio of as high as more than 3.0 × 3.0 times the original length. The resulting stretched films have a strength of at least 2,000 Kg/cm$^2$ and a Young's modulus of at least 3 × 10$^4$Kg/cm$^2$ and also possess good chemical resistance.

Table 1

| Properties Runs | Drum temperature (°C) | Contact time (Seconds) | Properties of unstretched film | | | | | Maximum stretch ratio (MD×TD)* | Properties of stretched film | | |
|---|---|---|---|---|---|---|---|---|---|---|---|
| | | | Elongation (%) | Strength (Kg/cm$^2$) | Dielectric breakdown voltage (KV/mm) | Thermal Stability | Density (g/cm$^3$) | | Strength (×10$^3$ Kg/cm$^2$) | Young's modulus ×10$^4$ Kg/cm$^2$ | Chemical resistance |
| Example 1 | 140 | 20 | 400 | 700 | 125 | Good | 1.300 | 3.9×3.9 | 2.90 | 4.00 | Good |
| Comparative Example 1 | 140 | 0.5 | 250 | 730 | 128 | Poor | 1.321 | 2.6×2.6 | 1.90 | 2.32 | Poor |
| " 2 | 140 | 330 | 180 | 690 | 120 | Poor | 1.325 | 2.5×2.5 | 1.55 | 2.20 | Poor |
| " 3 | 70 | 20 | 95 | 710 | 120 | Poor | 1.328 | 2.1×2.1 | 1.05 | 1.96 | Poor |
| " 4 | 245 | 20 | 450 | 610 | 115 | Poor | 1.321 | 2.3×2.3 | 1.35 | 2.00 | Poor |
| Example 2 | 80 | 3 | 300 | 720 | 120 | Fair | 1.317 | 3.2×3.2 | 2.30 | 3.00 | Good |
| " 3 | 210 | 3 | 360 | 690 | 124 | Fair | 1.313 | 3.4×3.4 | 2.55 | 3.50 | Good |
| " 4 | 105 | 10 | 380 | 700 | 120 | Good | 1.308 | 3.8×3.8 | 2.80 | 3.80 | Good |
| " 5 | 165 | 10 | 450 | 710 | 125 | Good | 1.305 | 3.8×3.8 | 2.85 | 3.90 | Good |
| " 6 | 105 | 78 | 360 | 700 | 123 | Good | 1.310 | 3.6×3.6 | 2.70 | 3.65 | Good |
| " 7 | 165 | 78 | 380 | 700 | 120 | Good | 1.312 | 3.5×3.5 | 2.60 | 3.55 | Good |
| " 8 | 180 | 132 | 300 | 680 | 123 | Fair | 1.318 | 3.3×3.3 | 2.21 | 3.15 | Good |

Table 1-continued

| Properties Runs | Drum temperature (°C) | Contact time (Seconds) | Properties of unstretched film | | | | | Maximum stretch ratio (MD×TD)* | Properties of stretched film | | |
|---|---|---|---|---|---|---|---|---|---|---|---|
| | | | Elongation (%) | Strength (Kg/cm²) | Dielectric breakdown voltage (KV/mm) | Thermal Stability | Density (g/cm³) | | Strength (×10³ Kg/cm²) | Young's modulus ×10⁴ Kg/cm² | Chemical resistance |
| " 9 | 210 | 132 | 320 | 670 | 120 | Fair | 1.320 | 3.2×3.2 | 2.05 | 3.02 | Good |

*MD=machine direction (longitudinal direction)
TD=transverse direction

EXAMPLE 10

The chips of poly(tetramethylene naphthalene-2,6-dicarboxylate) obtained in Referential Example A were melted at 280°C., and extruded through a T-die. The extruded film was passed through an atmosphere held at 300°C. and provided in a region extending from the T-die to a point 50 cm below it in the course of 6 seconds. Immediately then, the film was held between chilled rolls kept at 10°C. to cool it, and taken up without applying draft to afford an unstretched film having a thickness of about 200 microns. The unstretched film was transparent, and had a density of 1.319, an elongation of 320%, a strength of 670 Kg/cm², and a dielectric breakdown voltage of 120 KV/mm. It also had thermal stability rated "good", and could be stretched at 3.0 × 3.0 times the original length at 85°C.

EXAMPLE 11

Chips of poly(tetramethylene naphthalene-2,6-dicarboxylate) having an intrinsic viscosity of 0.82 which were prepared in the same way as in Referential Example A were melted at 278°C., and extruded through a T-die into a cotton seed oil bath kept at 100°C. and having the liquid surface at a distance 15mm apart from the T-die. After a residence time of 10 seconds in the oil bath, the film was taken up. In order to prevent the film from swinging sideways in the oil bath, two nip rolls adapted to be rotated at equal speeds were provided, one at a point of film entry and the other at a point of film exit. After withdrawing from the bath, the film was quenched with water at 10°C., taken up, and wiped off with degreased cotton to remove the adhering oil.

The resulting unstretched film was transparent, and had a thickness of 250 microns, a density of 1.317, an elongation of 300%, a strength of 690 Kg/cm² and a dielectric breakdown voltage of 115 KV/mm. The film could be stretched to an extent of 3.1 × 3.1 times the original length at 85°C.

EXAMPLES 12 and COMPARATIVE EXAMPLE 5

The same poly(tetramethylene naphthalene-2,6-dicarboxylate) chips as prepared in Example 11 were extruded at 280°C. through a ring die into a tube. The extruded tube was passed through an atmosphere heated at 350°C. and provided in a region extending from the die to a point 80 cm from it for a residence time of 11 seconds, and then quenched with air at room temperature to afford a transparent unstretched tube having an inside diameter of 15 mm, a thickness of about 400 microns and a density of 1.316. The unstretched tube could be stretched to 3.7 × 4.0 times simultaneously in the longitudinal direction and in the diametrical direction in a block heater whose central portion was heated at 90°C.

For comparison, the extruded tube was directly quenched with air at room temperature without passing it through the heated atmosphere (350°C.). The solidified tube was white and semi-transparent and had a density of 1.320. In a block heater held at 90°C., it could be uniformly stretched only to an extent of 2.8 × 2.9 times (length × diameter).

EXAMPLES 13 to 16 AND COMPARATIVE EXAMPLE 6 to 7

The chips of poly(hexamethylene naphthalene-2,6-dicarboxylate) prepared in Referential Example B were melted at 250°C., and extruded through a T-die onto a casting drum kept at each of the temperatures shown in Table 2. The extruded film was contacted with the casting drum for the time indicated in Table 2, and immediately then, air was blown against it by an air knife to afford a transparent unstretched film having a thickness of about 300 microns. The properties of the unstretched films are shown in Table 2.

The unstretched film was then stretched at 70°C. simultaneously in two directions. The maximum stretch ratio at which the film could be uniformly stretched without breakage was determined. Furthermore, the stretched film was heat-treated at 180°C. at constant length, and the properties of the treated film were measured. The results are also shown in Table 2.

Table 2

| Properties Runs | Drum temperature (°C) | Contact time (seconds) | Properties of unstretched film | | | | | Maximum draw ratio (MD × TD)* | Properties of stretched film | | |
|---|---|---|---|---|---|---|---|---|---|---|---|
| | | | Elongation (%) | Strength (Kg/cm²) | Dielectric breakdown voltage (KV/mm) | Thermal stability | Density g/cm³ | | Strength (×10³ Kg/cm²) | Young's modulus (×10⁴ Kg/cm²) | Chemical resistance |
| Comparative Example 6 | — | — | 105 | 570 | 128 | Poor | 1.249 | 2.2×2.2 | 0.95 | 1.21 | Poor |
| Example 13 | 120 | 18 | 320 | 610 | 135 | Good | 1.233 | 3.8×3.8 | 2.50 | 3.14 | Good |

Table 2-continued

| Properties / Runs | Drum temperature (°C) | Contact time (seconds) | Elongation (%) | Strength (Kg/cm²) | Dielectric breakdown voltage (KV/mm) | Thermal stability | Density g/cm³ | Maximum draw ratio (MD × TD)* | Strength (×10³ Kg/cm²) | Young's modulus (×10⁴ Kg/cm²) | Chemical resistance |
|---|---|---|---|---|---|---|---|---|---|---|---|
| " 14 | 155 | 60 | 310 | 600 | 130 | Good | 1.237 | 3.6×3.6 | 2.32 | 3.03 | Good |
| " 15 | 85 | 132 | 300 | 640 | 132 | Fair | 1.240 | 3.2×3.2 | 2.14 | 2.74 | Good |
| Comparative Example 7 | 120 | 330 | 220 | 650 | 133 | Poor | 1.250 | 2.6×2.6 | 1.01 | 1.47 | Poor |
| Example 16 | 200 | 3 | 290 | 620 | 128 | Fair | 1.241 | 3.1×3.1 | 2.11 | 2.50 | Good |

*MD=machine direction (longitudinal direction)
TD=transverse direction

It can be seen from Table 2 that the poly(hexamethylene naphthalene-2,6-dicarboxylate) films treated by the process of this invention have thermal stability in the unstretched state, and can be oriented to a high extent, and that the stretched films also have superior properties.

What we claim is:

1. A process for preparing a transparent shaped article by melt-extruding a polyester containing tetramethylene naphthalene-2,6-dicarboxylate or hexamethylene naphthalene-2,6-dicarboxylate as a main recurring unit, comprising exposing the extrudate to a temperature ranging from 75°C. to a temperature lower than the melting point of the polyester for 5 to 180 seconds immediately after extrusion to thereby solidify the extrudate without any substantial crystallization and thereafter quenching said solidified extrudate to produce a transparent shaped polyester article wherein said exposure and quenching steps are carried out prior to any stretching of said shaped transparent article.

2. A process for preparing a transparent sheet or film by melt-extruding a polyester containing tetramethylene naphthalene-2,6-dicarboxylate or hexamethylene naphthalene-2,6-dicarboxylate, comprising intimately contacting the extrudate with the surface of a casting drum kept at a temperature ranging from 75°C. to a point lower than the melting point of the polyester for 5 to 180 seconds immediately after extrusion to thereby solidify the extrudate without any substantial crystallization and thereafter quenching said solidified extrudate to produce a transparent polyester sheet or film wherein said intimate contacting and quenching steps are carried out prior to any stretching of said transparent sheet or film.

3. A process for preparing a transparent tube by melt-extruding a polyester containing tetramethylene naphthalene-2,6-dicarboxylate, comprising passing the extrudate through and in contact with a gaseous atmosphere kept at a temperature of 150° to 450°C. for 1 to 30 seconds immediately after extrusion to thereby solidify said extrudate without any substantial crystallization and thereafter quenching said solidified extrudate to produce a transparent polyester tube wherein said extrudate is passed through the gaseous atmosphere and quenched prior to any stretching of said transparent tube.

4. A process for preparing a transparent sheet, film or tube by melt-extruding a polyester containing tetramethylene naphthalene-2,6-dicarboxylate or hexamethylene naphthalene-2,6-dicarboxylate as a main recurring unit, comprising passing the extrudate through and in contact with a liquid medium kept at a temperature ranging from 75°C. to a point lower than the melting point of the polyester for 5 to 180 seconds immediately after extrusion to thereby solidify said extrudate without any substantial crystallization and thereafter quenching said solidified extrudate to produce a transparent polyester sheet, film or tube wherein said extrudate is passed through the liquid medium and quenched prior to any stretching of said transparent sheet, film or tube.

* * * * *